United States Patent [19]
Tait

[11] Patent Number: 5,463,973
[45] Date of Patent: Nov. 7, 1995

[54] DECORATIVE BANNER MOUNTING KIT

[76] Inventor: Thomas M. Tait, P.O. Box 160, Danville, Calif. 94526

[21] Appl. No.: 145,485

[22] Filed: Oct. 29, 1993

[51] Int. Cl.$^6$ ............................ G09F 17/00; G09F 15/00; A47B 96/06
[52] U.S. Cl. .................. 116/173; 40/607; 248/231.41; 248/219.4; 403/3; 403/256
[58] Field of Search ..................... 116/173, 174, 116/175; 40/607, 606, 612; 248/219.1, 219.3, 219.4, 218.4, 222.4, 223.4, 231, 230; 403/3, 256, 258

[56] References Cited

U.S. PATENT DOCUMENTS

| | | |
|---|---|---|
| 321,887 | 7/1885 | Cross . |
| 1,056,911 | 3/1913 | Kinzey ................................ 248/222.2 |
| 2,174,140 | 9/1939 | Schofield ................................ 248/224 |
| 2,736,100 | 2/1956 | Landau ..................................... 33/169 |
| 2,794,414 | 6/1957 | Reifschneider ......................... 116/173 |
| 3,241,800 | 3/1966 | Richter, III ............................. 248/231 |
| 3,341,959 | 9/1967 | Sabadics ................................... 40/145 |
| 3,462,110 | 8/1969 | Cheslock ................................ 248/221 |
| 3,654,718 | 4/1972 | Bianchi ..................................... 40/607 |
| 4,211,381 | 7/1980 | Heard ..................................... 248/231 |
| 4,276,706 | 7/1981 | Scott ......................................... 40/607 |
| 4,408,407 | 10/1983 | Bloom et al. ........................... 40/607 |
| 4,474,132 | 10/1984 | Fritsch .................................... 116/173 |
| 4,708,309 | 11/1987 | Walter .................................... 248/218.4 |
| 4,730,803 | 3/1988 | Hillstrom ............................... 248/297.2 |
| 4,801,115 | 1/1989 | Heard ....................................... 40/607 |
| 4,880,195 | 11/1989 | Lepley .................................. 248/219.4 |
| 5,050,832 | 9/1991 | Lee et al. .............................. 248/222.2 |
| 5,156,110 | 10/1992 | Fuller ..................................... 116/173 |

OTHER PUBLICATIONS

Kalamazoo Banner Works, "BannerFlex Bracket Systems" Brochure, Circa 1989.

Primary Examiner—Andres Kashnikow
Assistant Examiner—Andrew Hirshfeld
Attorney, Agent, or Firm—Bielen, Peterson & Lampe

[57] ABSTRACT

A banner mounting kit for use with decorative banners, the mounting kit including a bracket assembly with a base unit with attachment apparatus for mounting the base unit to a support structure such as a post, wall or other generally pre-existing structure, the base unit having a T-shaped slide rail of substantially uniform cross section, the bracket assembly also including an arm unit with a pole socket, a banner pole and banner tie down anchor, the arm unit having a key slot complementary to the slide rail for slidably engaging the arm unit on the base unit, the arm unit and base unit having an interconnection mechanism that adjustably secures the arm unit to the base unit, the arm unit having a centered pole socket in which one end of a banner pole is mounted, the banner pole engaging one end of a decorative banner, the bracket assembly being principally used in a paired, spaced arrangement for stretching a banner therebetween.

8 Claims, 2 Drawing Sheets

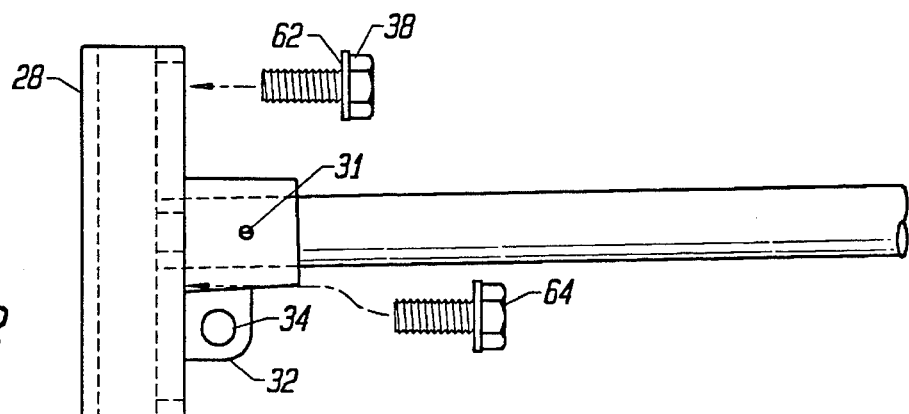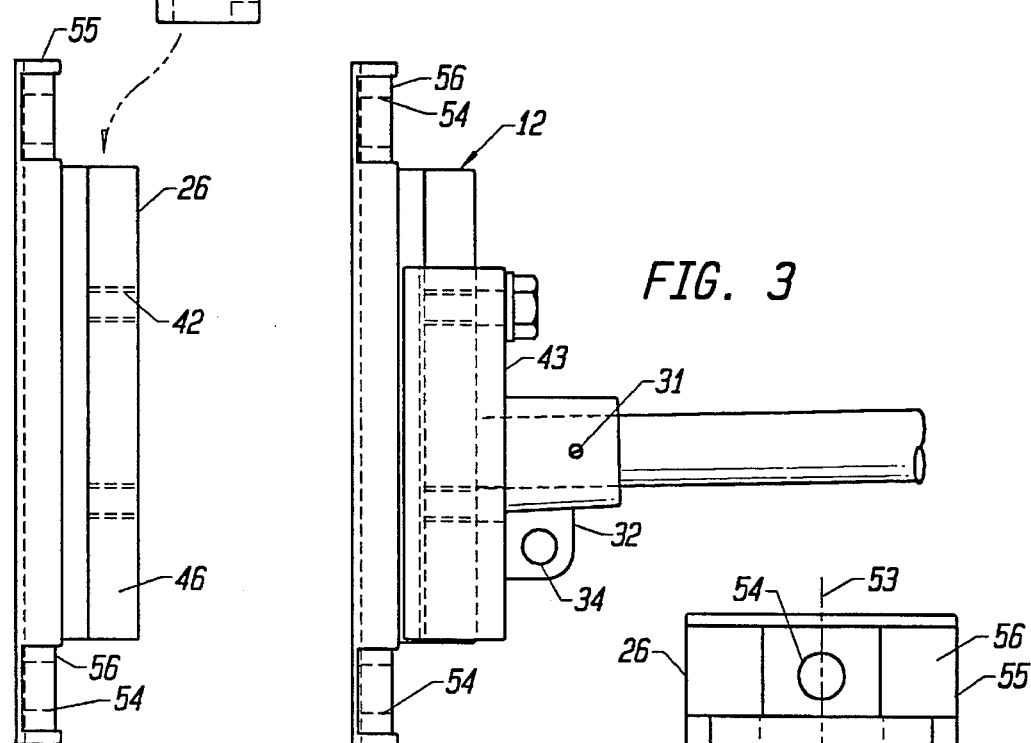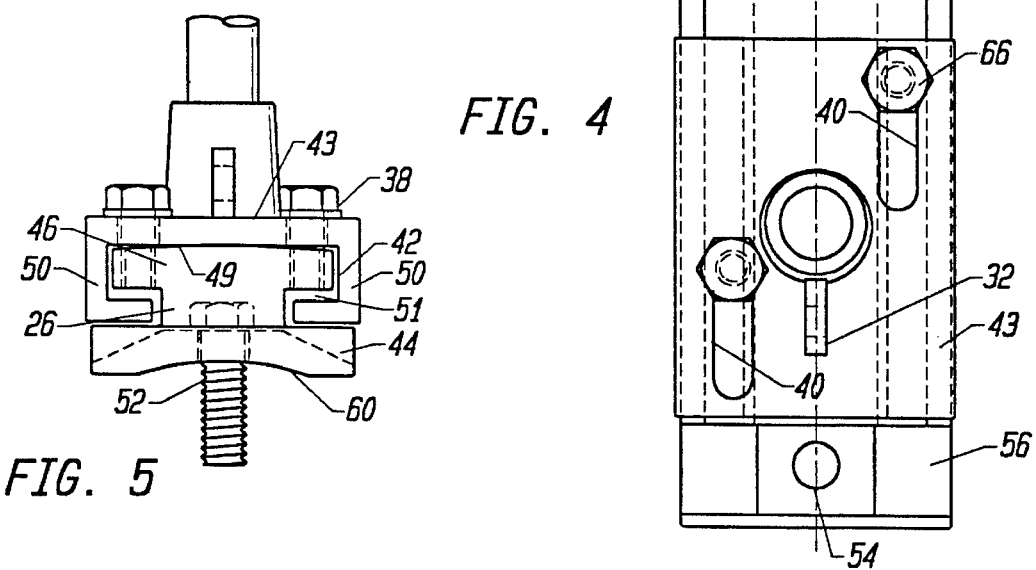

DECORATIVE BANNER MOUNTING KIT

BACKGROUND OF THE INVENTION

This invention relates to a banner mounting kit for use with decorative banners. The banner mounting kit may include special banners of a particular design for advantageous use with the mounting kit. Decorative banner mounting systems have been devised for display of banners from posts, walls, and other permanent structures where a decorative or informational banner is desired to be displayed. While a variety of different size banners of different display content are intended, the use of the term decorative banners is used to connote generally rectangular banners of both decorative and informational content.

Prior art systems include simple pole mounts that are attached directly to the mounting structure by fastening straps or bolts. Such systems frequently lack any means for adjustment and require repositioning of at least one of the mounting brackets that are provided with the pole mounts for each end of the banner. Frequently, two banners with a total of four mounting brackets are displayed on each side of a post. Since one set of attachment straps are provided for the two top brackets, and one set for the bottom brackets, individual adjustment for one banner is not possible in direct mount systems.

In a typical mounting system, a cloth or other flexible sheet having ends with a rod pocket are installed on substantially parallel-oriented banner poles that are vertically spaced on the support structure. Each banner pole is typically a tube or rod, and is preferably a high strength fiberglass rod that permits frequent flexing without failure. Because a banner is stretched between the displaced banner poles, the banner provides a windsheet that is subjected to the buffeting of winds which can exert substantial forces both on the mounting system and the banner poles. Such wind forces can not only tear or dislodge a banner, but may cause loosening or dislodgement of the mounting system. Because the mounting system may include a metal bracket mounted high above a pedestrian area such as a sidewalk, great care must be taken such that components do not become dislodged and result in a hazard to nearby individuals.

In the preferred system, the banner mounting kit must be easily installed and include a method for adjusting the spacing of the displaced poles such that the banner, spanning the space between poles, is maintained taut. When the outer edge of the banner is not taut, the edge can flap in the wind and initiate tearing or slippage from the support posts. Certain techniques, such as canting the banner poles, whereby the spacing between poles increases as the pole ends are approached are used to maintain the banner taut across its width. This technique is best combined with other means for securing the banner to the mounting system for optimum results.

SUMMARY OF THE INVENTION

The decorative banner mounting kit of this invention features a bracket assembly that is used in a paired, above and below arrangement for support of a pair of spaced banner poles between which is mounted a decorative banner. The banner mounting kit minimally comprises a pair of bracket assemblies, each assembly including a base unit with provision for mounting the base unit to a support structure, an arm unit with a socket for installation of a banner pole, and a mechanism for adjustably interconnecting the base unit and arm unit. Preferably, the kit also includes a set of mounting bands for each bracket assembly, a pair of banner poles fabricated of a resilient material, and a specially designed banner having a rod pocket at each end of the banner with a tie member for securing the banner to the bracket assembly.

The bracket assembly is designed with the base unit including a mounting plate with a T-shaped slide rail of generally uniform cross section upon which a key slot of a bracket-shaped arm unit is slidably engaged. The base unit can advantageously be installed on the support structure with either end oriented upward. This facilitates installation and minimizes improper installation of the bracket assembly. The arm unit includes a projecting pole socket and a pair of elongated slots through which a pair of connection bolts pass when threadably engaged in holes in the surface of the slide rail. In this manner, the arm unit is connectable to the base unit with limited, bidirectional slide displacement when the machine screws are installed before tightening. This feature allows adjustment of the arm unit with respect to the fixed base unit to provide adjustment of the tension on the banner during and after installation. Once the desired degree of tautness to the banner has been achieved, the bolts are tightened and the arm unit is firmly fastened against the base unit. In the unlikely event that the machine bolts become loosened, because of improper tightening or usual environmental factors, the arm unit will not become separated from the base unit as displacement of the arm unit on the base unit is limited by the interconnection slots. This adjustment mechanism is also a safety feature to prevent inadvertent dislodgement of the arm unit from its elevated position on the support pole. As an added safety feature, the arm unit includes an anchor tab with an eyelet that is positioned proximate a corner of a mounted banner. In a complementary manner, the banner includes a pair of grommets, proximate the inside edge of the rod pocket allowing the banner to be secured to the arm unit with a small length of tie-down cord. In this manner, in the unlikely event the interconnection bolts become entirely unscrewed, the arm unit remains connected to the base unit without danger.

These and other features of this invention will become apparent from a consideration of the Detailed Description of the Preferred Embodiments.

BRIEF DESCRIPTION OF THE DRAWINGS

FIG. 2 is an exploded view of one of the bracket assemblies and a banner pole, partially fragmented, of the type shown in FIG. 1.

FIG. 3 is a side elevational view of the assembly of FIG. 2.

FIG. 4 is a front elevational view of the assembly of FIG. 2.

FIG. 5 is a bottom view of the assembly of FIG. 2 showing an alternate means of connecting the banner mounting kit to a support structure.

DETAILED DESCRIPTION OF THE PREFERRED EMBODIMENTS

Figure 1:
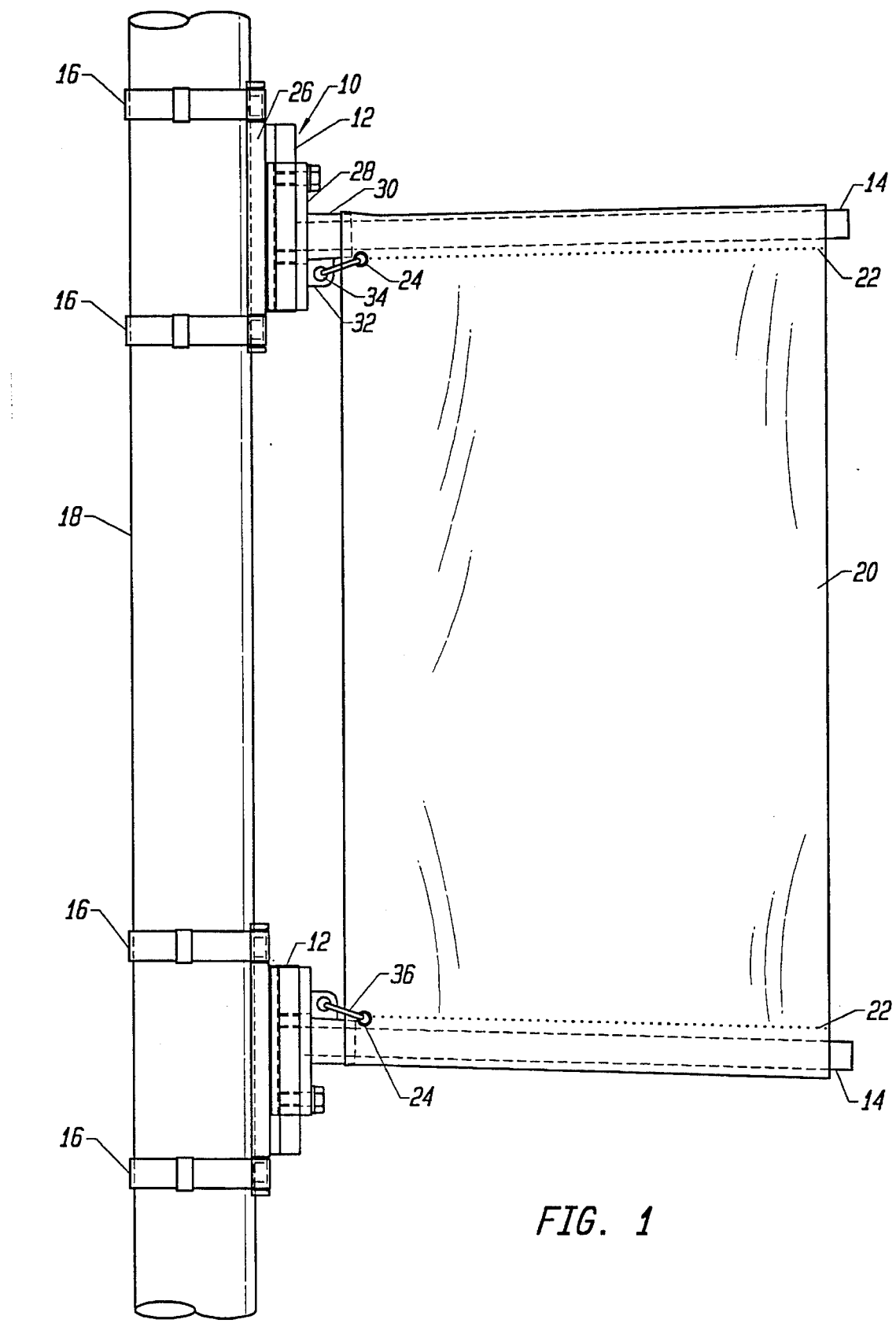
FIG. 1 is a complete banner mounting kit including a pair of bracket assemblies, a pair of banner poles, a banner and attachment straps as the means connecting the banner mounting kit to a support structure, here a support post.

Referring now to FIG. 1, the decorative banner mounting kit is shown in its inclusive assembly, and is designated generally, by the reference numeral 10. The mounting kit 10 includes a pair of bracket assemblies 12, a pair of displaced banner poles 14 mounted to the bracket assemblies, and an attachment means, here a pair of metal straps 16, connecting the bracket assemblies with a support post 18. The support post 18 is not a part of this invention and is customarily a preexisting structure. In certain circumstances, a support post or other support means may be provided for the decorative banner mounting system.

Stretched between the spaced pair of banner poles 14 is a decorative banner 20. The decorative banner is preferably of a woven fabric of durable material, such as woven polyester, having a rod pocket 22 at each end of the banner 20. The rod pocket 22 allows the banner 20 to be slipped onto the banner poles 14 for proper display. To insure that the banner 20 is maintained on the banner poles 14, the banner poles 14 are outwardly canted and the banner 20 has a grommet 24 at each of the two corners proximate the bracket assembly 12 for tieing the banner to the bracket assembly.

The bracket assembly 12 includes a base unit 26 and an arm unit 28. The base unit 26 in FIG. 1 includes pairs of straps 16 as an attachment mechanism to the existing support post 18. As noted, the design of the base unit allows the unit to be installed with either end upward, to minimize errors in installation. The arm unit 28 is slidably connected to the base unit 26 and includes thereon a pole socket 30 into which the banner pole 14 is inserted and secured by use of epoxy or other mechanical means such as a set screw 31. The arm unit 28 also includes an anchor tab 32 with an eyelet 34 that is positioned proximate the banner grommet 24 when the decorative banner 20 is installed on the banner poles 14. For maximum security, rod pocket 22 of the banner 20 is installed over the end of the pole socket 30, and the banner 20 is secured to the bracket assembly 12 by a short tie cord 36 that threads through the grommet 24 of the banner 20 and the eyelet 34 of the anchor tab 32 on the arm unit 28.

The particular manner of interconnecting the arm unit 28 with the base unit 26 of the bracket assembly 12 is shown with respect to FIGS. 2–5. With reference to the exploded view of FIG. 2, the arm unit 28 slidably engages the base unit 26 and is interconnected with limited displacement by a locking means comprising by a pair of bolts 38. As shown with reference to FIGS. 3–5, the bolts are installed through a pair of displaced slots 40 in the top side 43 of the arm unit 28 and threaded into holes 42 in the base unit 26. When the bolts 38 are tightened, the arm unit 28 is securely fastened to the base unit 26.

The arm unit is easily removable from the base unit during periods when the banner is not displayed. The base unit may remain in place on the support structure when the arm unit is removed to reduce the time of reinstallation of the arm units.

With reference to FIG. 5, the base unit 26 is of unitary construction with a mounting plate 44 that seats against the auxiliary support structure and a T-shaped slide rail 46 that is of substantially uniform cross section along the length of the rail. The arm unit 28 has a complementary configuration with a mounting surface on the topside which the pole socket 30 and anchor tab 32 project and an underside 49 that includes bracket-like side elements 50 that form a key slot 51 and engage the slide rail 46 and limit the movement of the arm unit to bidirectional linear displacements along the axis 53 of the rail as shown in FIG. 4. In this manner, the arm unit can be installed on the base unit 26 from either the top direction as shown in FIG. 2 or from the underside direction. It should be noted, however, that the unit should be installed such that the anchor tabs 32 are inwardly located to allow for engagement by the tie cord 36 securing the banner 20 to the bracket assembly 12. During installation, the weight of the installed cantilever banner pole causes the arm unit to cock on the vertically oriented slide rail and maintain its position. This allows the installer to easily insert the clamping bolts with the arm unit positioned on the base unit.

The configuration of the arm unit 28 and base unit 26 allows for use of a lag screw 52 as alternate means for connecting the base unit to a support structure. As the size of the lag screw 52 may vary according to the requirements for secured installation, the bracket assembly is designed such that the arm unit 28 will be freely slidably on the base unit 26 with ample clearance for the lag screw 52 or other bolt-like fasteners used in conjunction with the attachment holes 54 in each end extension 55 on the mounting plate 44 of the base unit 26.

As shown in FIGS. 3 and 4, the attachment holes 54 are centrally positioned in grooves 56 in the end extensions 55 for seating an attachment strap 16 at each end of each base unit when straps are employed as the attachment means. The attachment means of each alternative are located at the opposite end extensions 55 of the base unit 26 for maximizing the anchoring stability of the bracket assembly to the support structure. To improve seating of the base unit 26 to a support structure having a rounded cross section, such as the post 18 of FIG. 1, the underside 60 of the mounting plate 44 of the base unit 26 includes an arcuate surface configuration to conform to the outer surface of the support structure.

In the preferred embodiment, the base unit and arm unit are fabricated from cast aluminum and interconnected with stainless steel interconnecting bolts. The pole socket 30 of each arm unit is canted to provide the cant to the banner poles to provide the taut mounting of the banner as shown in FIG. 1. Preferably high-strength, flexible, unidirectional fiberglass banner poles are used. The two bracket assemblies that are used as a kit for mounting a decorative banner are connected to the existing support structure by rust resistant banding straps or zinc plated lag screws. In this manner, there is no opportunity for rust to develop and potentially stain or streak a banner during inclement weather.

To assist in convenient installation, the bolts interconnecting the arm unit 28 to the base unit 26 include an attached lock washer 62 and have a hex head 64 with a screwdriver slot 66 to allow for installation and adjustment using either a socket wrench or a screwdriver. This may be important where banners have stretched after installation and require tightening by adjustment of the arm unit with respect to the base unit 26 or when banners are changed, for example, at each change of season. Such adjustment can be performed with a simple screwdriver for convenience.

To install a banner with the banner mounting kit of this invention, the height above the ground for the bottom of the banner is marked on the post with chalk. The length of the banner above this chalk mark determines where the post is marked with chalk. The upper base unit is centered on the top chalk mark and taped to the post. The attachment straps are engaged in the grooves at each end of the base unit, double wrapped around the post and secured. The tape is removed and the arm unit, with connected banner pole, is slid down the track on the base unit with the anchor tab directed downward, centered and secured with the clamping bolts.

The top rod pocket of the banner is slid onto the banner pole and over the end of the pole socket. The corner of the banner is secured to the arm unit by a cord through the corner grommet on the banner and the eyelet on the anchor tab. The inside corner of the bottom of the banner is pulled down to chalk mark the position of the lower base unit, which is centered one inch above the chalk mark and taped. The lower base unit is aligned with the axis of the rail of the upper base unit, and secured with bands as described. The tape is then removed.

The banner pole of the lower arm unit is installed in the bottom rod pocket of the banner and the arm unit slid down the track of the base unit with the anchor tab directed upwardly. The clamping bolts are loosely installed when the slots on the armunit first align with the bolt holes in the base unit. The end of the rod pocket is installed over the pole socket and the lower armunit and the outer end of the banner pole are jointly pulled downward so that the banner is evenly taut across its surface with no slack on the outside edge.

The arm unit will remain in position without holding, while the upper bolt is tightened. Subsequently tightening the lower bolt, seats the cocked arm unit against the base unit in a clamping action. The top bolt is retightening and the banner corner is tied to the anchor tab.

The procedures are reversal to remove the banner and if desired, the bracket assemblies.

While, in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A decorative banner mounting kit for mounting a decorative banner to a support structure with the decorative banner stretched between a pair of banner poles, the decorative banner mounting kit comprising:

a pair of bracket assemblies, each bracket assembly including:

an interconnection mechanism having a base unit and an arm unit, the base unit having attachment means for attaching the base unit to the support structure, the base unit having a T-shaped slide rail of substantially uniform cross section, the arm unit having a top side with a pole socket and an underside with a key slot that has a configuration complementary with the T-shaped slide rail, wherein the arm unit is slidably engageable with the base unit when the slide rail of the base unit is installed in the key slot of the arm unit, the interconnection mechanism limiting bidirectional slide displacement of the arm unit on a linear axis when the arm unit is in slidable engagement with the base unit, the interconnection mechanism having fastening means for fastening the arm unit to the base unit; wherein on mounting of the bracket assemblies for display of the decorative banner, the bracket assemblies are positioned in a spaced above and below arrangement on the support structure with vertical alignment of the slide rails of the base units along the linear axis for slide displacement of the arm units with respect to the base units on the linear axis when engaged; wherein the interconnection mechanism of each bracket assembly prevents detachment of the arm unit from the base unit when the fastening means fails to fixedly fasten the arm unit to the base unit, wherein the adjustment means fastening means of the interconnection mechanism of each bracket assembly comprises a pair of elongated, laterally spaced bolt slots through the top side of the arm unit aligned in a direction parallel to the linear axis of the slide displacement of the arm unit on the base unit, complementary threaded bolt holes in the slide rail of the base unit, and threaded bolts which pass through the slots in the arm unit and threadably engage the bolt holes in the base unit wherein limited displacement of the arm unit on the base unit along the linear axis is permitted before tightening the bolts, wherein the arm unit is fixedly fastened to the base unit upon tightening the bolts.

2. The decorative banner mounting kit of claim 1 in combination with the pair of banner poles, wherein each banner pole has a first end and a second end, the first end of one of the banner poles being securable in the pole socket of one of the arm units, the first end of the other of the banner poles being securable in the pole socket of the other arm unit.

3. The decorative banner mounting kit of claim 2 wherein each of the pole sockets is oriented on the top side of the arm unit within which it is located to impart a cant to the banner pole, wherein on mounting the bracket assemblies on the support structure the banner poles are spaced apart with the spacing increasing between the first ends to the second ends.

4. The decorative banner mounting kit of claim 3 in combination with the banner, the banner having opposite ends each having a rod pocket, one of the rod pockets being engageable with one of the banner poles, the other of the rod pockets being engageable with the other of the banner poles, wherein the banner is stretched between the banner poles on installation.

5. The decorative banner mounting kit of claim 4 wherein each of the arm units includes an anchor tab with an eyelet and the banner includes tie-down means for securing the banner to the eyelet of each anchor tab.

6. The decorative banner mounting kit of claim 5 wherein the tie down means comprises a pair of grommets, one of the grommets being within an end of the banner proximate one of the pole sockets when the banner is installed on the banner poles and the banner poles are secured on the bracket assemblies, the other of the grommets being within an end of the banner proximate the other of the pole sockets when the banner is installed on the banner poles and the banner poles are secured on the bracket assemblies, the tie down means further comprising a pair of tie cords, each tie cord being engageable with one of the grommets and the eyelet of one of the anchor tabs.

7. The decorating banner mounting kit of claim 1 wherein the attachment means for attaching each base unit to the support structure comprises opposite end extensions of each base unit projecting beyond the slide rail of each base unit, the end extensions of each base unite including a strap groove, for receiving an adjustable strap.

8. The decorative banner mounting kit of claim 1 wherein the attachment means for attaching each of the base units to the support structure comprises opposite end extensions protruding from each base unit, each of the end extensions having attachment holes adapted to receive fasteners.

\* \* \* \* \*